United States Patent [19]

Mochida et al.

[11] 4,396,664
[45] Aug. 2, 1983

[54] CERAMIC HONEYCOMB STRUCTURAL BODY

[75] Inventors: Shigeru Mochida, Kasugai; Masaru Kojima; Toshihiko Hijikata, both of Nagoya, all of Japan

[73] Assignee: NGK Insulators, Ltd., Nagoya, Japan

[21] Appl. No.: 262,941

[22] Filed: May 12, 1981

[30] Foreign Application Priority Data

May 20, 1980 [JP] Japan .................................. 55-65934

[51] Int. Cl.³ .............................................. C01D 15/00
[52] U.S. Cl. ..................................... 428/116; 422/180
[58] Field of Search .......................... 428/116; 422/180; 252/477 R

[56]  References Cited
U.S. PATENT DOCUMENTS 3,505,030  4/1970  Sowards ........................... 428/116 X
3,801,289  4/1974  Wiley ............................... 252/477 R
4,250,146  2/1981  Bailey ............................... 422/180 X
4,279,864  7/1981  Nara et al. ........................ 422/180 X Primary Examiner—Marion McCamish
Attorney, Agent, or Firm—Parkhurst & Oliff

[57]  ABSTRACT

A ceramic honeycomb structural body to be used in an automobile monolith catalyst converter in which the ceramic honeycomb structural body having numerous parallel channels are clamped by annular supporting members perpendicular to axis of said channels has such a structure that end surfaces of the ceramic honeycomb structural body are more strongly clamped at an inner circumferential portion of the above described annular supporting members than at the outer circumferential portion of said annular supporting members. Such a ceramic honeycomb structural body is stably held in the catalyst converter without forming break at the peripheral portion of the end surface of the honeycomb structural body.

1 Claim, 6 Drawing Figures

CERAMIC HONEYCOMB STRUCTURAL BODY

BACKGROUND OF THE INVENTION

1. Field of the Invention

The present invention relates to a ceramic honeycomb structural body used for an automobile monolith catalyst converter.

2. Description of the Prior Art

An automobile monolith catalyst converter is generally constructed of a ceramic honeycomb structural body having numerous parallel channels depositing a catalytic meal, a casing, and supporting members holding the honeycomb structural body and the casing.

The catalyst converter is concurrently subjected to thermal action owing to an exhausted gas at high temperatures and to mechanical shock of engine vibration and driving road vibration and the like.

Ceramic honeycomb structural bodies are brittle against vibration and shock and are readily broken and further have a much lower thermal expansion coefficient than the above described catalyst casing and supporting members.

Accordingly, serious consideration has been heretofore given to the structure wherein the ceramic honeycomb structural body is held in the catalyst casing through supporting members.

Thus, it is necessary that the ceramic honeycomb structural body is clamped with a given compressed force through elastic supporting members so as not to break the ceramic honeycomb structural body owing to impact or rubbing of the ceramic honeycomb structural body against the catalyst casing, due to the above described vibrations, and that the honeycomb structural body is clamped with such a sufficient compressed force even at high temperatures that the abutting surfaces of the ceramic honeycomb structural body and the supporting members do not separate due to the difference of the thermal expansion coefficients. A variety of devices have been made with respect to the structure, material quality and shape of the supporting member.

In the automobile monolith catalyst converters having the structure wherein circumferential portions on both end surfaces of a ceramic honeycomb structural body are clamped by annular supporting members, each having a surface perpendicular to axis of the channels of the honeycomb structural body, having substantially uniform thickness and density with said perpendicular surface to the axis of the channels, there have been the following proposals. As shown in FIG. 1, heat resistant annular supporting member 1 having elasticity, which is composed of metal fibers, such as stainless steel, ceramic fibers or a combination thereof, has been proposed. Alternatively, as shown in FIG. 2, an annular supporting member 1 provided with an arm portion 3 having a sufficient longitudinal length which is elongated by the thermal expansion to compensate the separation due to the difference of the above described thermal expansion coefficients, is provided in the catalyst casing 2.

These proposals have the good elasticity to solve the problem caused from the above described difference of thermal expansion, and the ceramic honeycomb structural body is always clamped with moderate compressed force, but the edge of end surface of the ceramic honeycomb structural body is broken and unpurified exhausted gas leaks from the broken portions while the purifying ability is deteriorated. The break is further increased, and finally, the ceramic honeycomb structural body is put out of the supporting members and the purification becomes infeasible.

The breakage problem of the ceramic honeycomb structural body noted above is solved by reducing the compressed force applied to the end surfaces of the ceramic honeycomb structural body from the supporting members, but if the above described compressed force is reduced, as mentioned above, the breakage occurs due to the vibration, or, the unpurified exhausted gas is discharged through space between the inner surface of the catalyst casing and the outer circumferential side surface of the ceramic honeycomb structural body, thereby deteriorating the purifying ability. Therefore, the ceramic honeycomb structural body which does not cause breakage even if the honeycomb structural body is clamped with higher compressed force is needed.

SUMMARY OF THE INVENTION

The present invention has been made for solving the above described defects and is to provide a ceramic honeycomb structural body to be used for an automobile monolith catalyst converter having a structure such that peripheral portions of both end surfaces of the ceramic honeycomb structural body having numeral parallel channels are clamped with annular supporting members perpendicular to the axis of the channels. In this structure, the end surfaces of the ceramic honeycomb structural body are more strongly clamped at the inner circumferential portion of the annular supporting member than at the outer circumferential portion, and the distribution of the compressed force applied to the end surface of the ceramic honeycomb structural body from the annular supporting member is larger at the end surface portion of the ceramic honeycomb structural body abutting against the above described inner circumferential portion, and is smaller at the end surface portion of the ceramic honeycomb structural body abutting against the above described outer circumferential portion. As a result, no break is formed even when clamping with a higher compressed force is used.

DESCRIPTION OF THE PREFERRED EMBODIMENTS

Figure 4:
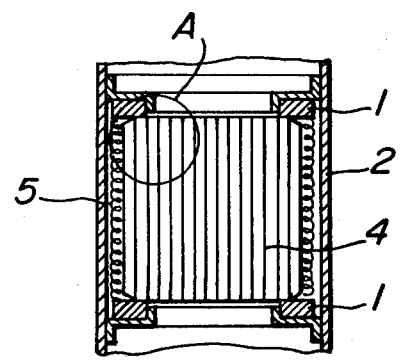
FIG. 4 is a partial cross-sectional view of one example of the present invention.

More detailed construction of the present invention will be explained with reference to example shown in FIG. 4. FIG. 4 shows an automobile monolith catalyst converter wherein a ceramic honeycomb structural body 4 depositing a metal catalyst is held in a cylindrical stainless steel casing 2 through a holding member 5 provided in space formed between an inner surface of the catalyst casing 2 and an outer circumference of the ceramic honeycomb structural body 4, and annular supporting members 1 having surfaces perpendicular to an axis of the channels and substantially uniform thickness and density are abutting against peripheral portions of both end surfaces of the ceramic honeycomb structural body.

Figure 5:
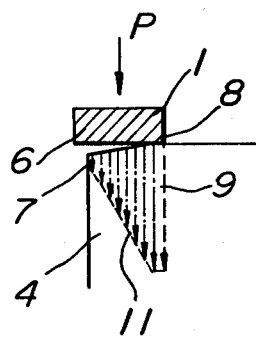
FIG. 5 is an enlarged view of a portion A in FIG. 4.

FIG. 5 shows the relation of position of an annular supporting member 1 and the ceramic honeycomb structural body 4 prior to applying a load. When a load P is applied, the outer circumferential portion 6 of the annular supporting member 1 comes in contact with the peripheral portion 7 of the end surface of the ceramic honeycomb structural body 4. That is, the peripheral portion of the end surface of the ceramic honeycomb structural body 4 against which the annular supporting member 1 abuts, forms an inclined plane where the height increases from the portion 7 abutting against the outer circumferential portion 6 of the annular supporting member 1 towards the portion 9 abutting against the inner circumferential portion 8 of the annular supporting member 1.

Figure 1:
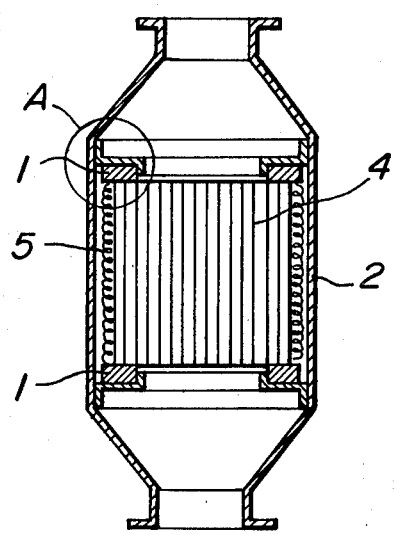
FIGS. 1 and 2 are cross-sectional views of conventional automobile monolith catalyst converters.
Figure 2:
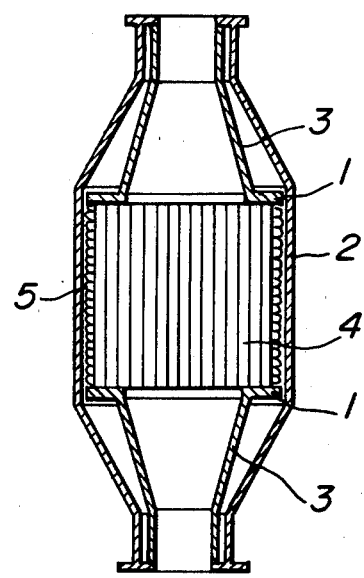
Figure 3:
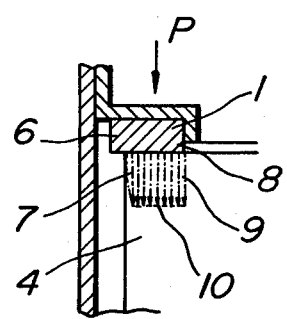
FIG. 3 is an enlarged view of a portion A in FIG. 1.

When considering the distribution of the compressed force of the annular supporting member 1 in the axial direction of the catalyst converter acting to the peripheral portion of the end surface of the ceramic honeycomb structural body, in the conventional ceramic honeycomb structural body having the structure wherein the peripheral portion of the end surface of the ceramic honeycomb structural body is perpendicular to the above described axial direction, the distribution of the compressed load at the peripheral portion of the end surface of the ceramic honeycomb structural body 4 is as shown by broken lines 10 in FIG. 3 and the compressed load at the portion 7 abutting against the outer circumferential portion 6 of the annular supporting member 1 is equal to that at the portion 9 abutting against the inner circumferential portion 8, and this becomes a cause for forming the break upon using. In the ceramic honeycomb structural body having the construction of the present invention, as shown by broken lines 11 in FIG. 5, the compressed load at the portion 7 abutting against the outer circumferential portion 6 of the annular supporting member 1 is smaller than that at the other portion, so even though the compressed force due to the clamping of the annular supporting member is larger, this force being the total sum of the compressed load, the break is not formed at the peripheral portion of the ceramic honeycomb structural body.

Figure 6:
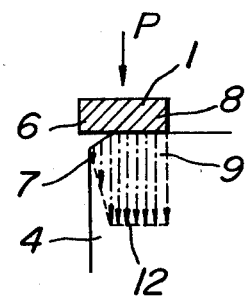
FIG. 6 is a partial enlarged view of another example of the present invention.

In this example, the end surface from the above described portion 7 to the above described portion 9 is formed by one inclined plane, but the structure of the honeycomb structural body of the present invention may be one as shown in FIG. 6, wherein the portion 7 abutting against the outer circumferential portion 6 of the annular supporting member 1 forms one inclined plane while the portion 9 abutting against the inner circumferential portion 8 is formed by a plane perpendicular to the above described axial direction and the distribution of the above described compressed force is shown by broken lines 12 in FIG. 6. The compressed load at the portion 7 is reduced, and this example has the same effect as in the former example.

The following example is given for the purpose of illustration of this invention and are not intended as limitations thereof.

EXAMPLE

A comparative test was made with respect to the ceramic honeycomb structural bodies of the present invention and a conventional ceramic honeycomb structural body. The results obtained are mentioned hereinafter.

To a catalyst converter wherein a cordierite ceramic honeycomb structural body having square-shaped channels, a pitch of neighboring channels being 1.27 mm and a thickness of a partition wall being 0.15 mm, a radius of 60 mm and a length of 100 mm was clamped and set under various compressed forces through the given supporting members in the given catalyst casing, were fed combustion gas having the given high temperature as shown in Table 1 and hot air at about 100° C. in 20 cycles, in each cycle the combustion gas and the hot air being fed for 10 minutes respectively, and then the ceramic honeycomb structural body was taken out from the above described catalyst converter and observed with respect to the break.

The results are shown in the following Table 1 and the ceramic honeycomb structural bodies of the present invention have an excellent limiting value of the compressed force by which the break is formed, that is several times higher than the ceramic honeycomb structural body having the conventional structure.

TABLE 1

| End surface shape | Conventional sample A | | Present invention | | | |
|---|---|---|---|---|---|---|
| Combustion gas | | | B | | C | |
| temperature (°C.) | 900 | 1,000 | 900 | 1,000 | 900 | 1,000 |
| Compressed force 100 | o | o | o | o | o | o |
| (kg)           200 | x | Δ | o | o | o | o |
|                300 | x | x | o | Δ | o | o |
|                400 | x | x | o | x | o | Δ |

A: End surface shape shown in FIG. 3
B: End surface shape shown in FIG. 6
C: End surface shape shown in FIG. 5
o: No break, Δ: Small break, x: Large break Since the present invention has the above described construction, when the ceramic honeycomb structural bodies of the present invention are used, even if the compressed force of the supporting member is far higher than that used in the conventional ceramic honeycomb structural body, no breaks are formed at the end surface edge of the ceramic honeycomb structural body. Accordingly, in the ceramic honeycomb structural body of the present invention, it is not necessary to take the structure, material quality and shape of the supporting member (which have previously been taken into account), into consideration when clamping the honeycomb structural body more strongly with the supporting members. Thus, stable mechanical performance and high purifying ability can be obtained, without causing any break, for a long period of time.

What is claimed is:

1. A monolithic catalyic converter, comprising:
    a housing;
    a ceramic, honeycomb structural body disposed within said housing, said body having two end surfaces and a plurality of channels extending through the body between the end surfaces, each of said end surfaces having an inner circumferential portion and an outer circumferential portion contiguous with and extending radially outwardly from the inner circumferential portion;
    a plurality of annular supports within said housing for contacting each of the end surfaces of said structural body; substantially perpendicular to the axis of said parallel channels;

clamping means for applying pressure to said annular supports to clamp said end surfaces, each of said outer circumferential portions having a first portion contiguous with said inner circumferential portion and having a surface parallel to and abutting one of said annular supports, and a second portion radially outward of said first portion having a surface which is not parallel to said support and which is spaced from said supports, the pressure applied to said first portion being greater than the pressure applied to said second portion.

* * * * *